United States Patent [19]

Maucher

[11] 4,238,018
[45] Dec. 9, 1980

[54] DISENGAGING UNIT FOR DRAWING DISENGAGEABLE FRICTION CLUTCHES, ESPECIALLY FOR MOTOR VEHICLES

[75] Inventor: Paul Maucher, Sasbach, Fed. Rep. of Germany

[73] Assignee: LuK Lamellen und Kupplungsbau GmbH, Bühl, Fed. Rep. of Germany

[21] Appl. No.: 846,847

[22] Filed: Oct. 31, 1977

[30] Foreign Application Priority Data

Oct. 30, 1976 [DE] Fed. Rep. of Germany ....... 2650140

[51] Int. Cl.³ .............................................. F16D 23/14
[52] U.S. Cl. .................................. 192/98; 192/89 B; 192/110 B; 308/230
[58] Field of Search ................... 192/98, 110 B, 89 B, 192/110 R, 99 A, 70.3, 70.27; 308/230

[56] References Cited

U.S. PATENT DOCUMENTS

| 3,104,746 | 9/1963 | Gadd et al. | 192/89 B |
| 4,093,053 | 6/1978 | Ernst et al. | 192/98 |

FOREIGN PATENT DOCUMENTS

| 2414539 | 10/1974 | Fed. Rep. of Germany | 192/98 |
| 7621572 | 10/1976 | Fed. Rep. of Germany | 192/98 |
| 2304826 | 10/1976 | France | 192/98 |
| 2357784 | 3/1978 | France | 192/98 |
| 1201674 | 8/1970 | United Kingdom | 192/89 B |

*Primary Examiner*—Allan D. Herrmann
*Attorney, Agent, or Firm*—Herbert L. Lerner

[57] ABSTRACT

A disengaging unit for drawingly disengageable friction clutches has a guide member with two ring-shaped sliding regions axially spaced from one another and mutually separated by a hollow chamber, one of the sliding regions facing toward a transmission side of the disengaging unit, the guide member cooperating with disengaging means of the friction clutch for axially sliding the latter along a guide tube. One of either the guide member or the guide tube is formed with a capture inclination for securing the other thereof, the capture inclination of the guide tube being a downwardly tapering contour while that of the guide member being an outwardly flaring funnel-shaped contour. The one sliding region has a diameter and contour which, together with the spacing between both sliding regions and the construction of the hollow chamber therebetween as well as the respective capture inclination, are coordinated so that the guide tube and a disengaging member linkable to the disengaging means are swingable relative to one another about the one sliding region when a free end of the guide tube is received in vicinity of the hollow chamber of the guide member.

5 Claims, 2 Drawing Figures

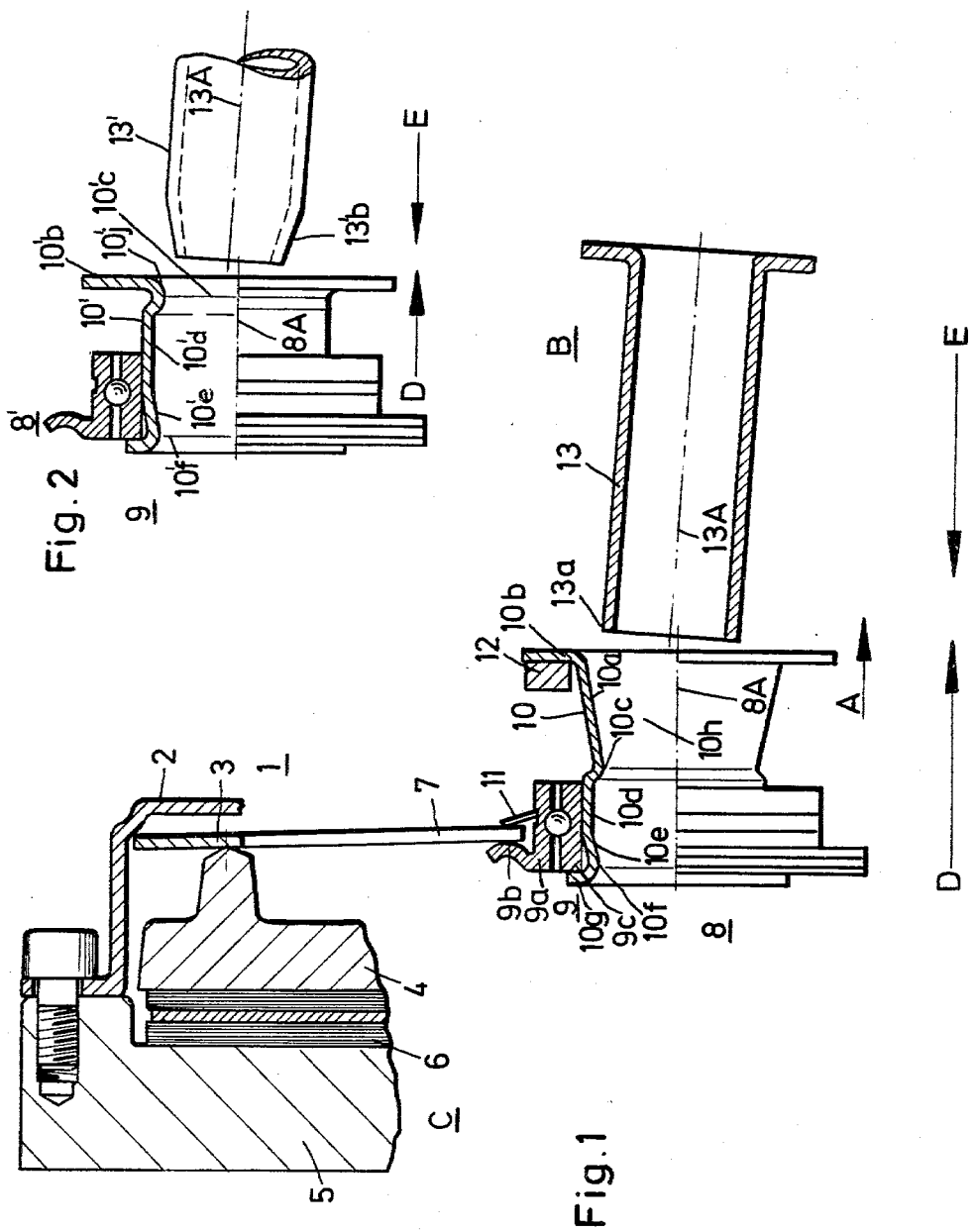

DISENGAGING UNIT FOR DRAWING DISENGAGEABLE FRICTION CLUTCHES, ESPECIALLY FOR MOTOR VEHICLES

The invention relates to a disengaging unit or shifter for drawingly or pull-type disengageable friction clutches, especially for motor vehicles, having a disengaging member linkable to respective disengaging means of the friction clutch, and further having an antifriction bearing with a revolving race revolvable together with the disengaging means of the friction clutch, and a nonrevolving race rigid with a guide member of the disengaging unit, the disengaging member, when subjected to the action of an actuating member such as a disengaging fork, being axially slidably shiftable by means of the inner bore of the guide member over and along a guide tube disposed at a transmission side of the disengaging member.

With such friction clutches, which have become known as so-called "drawn" or "pulled" clutches, the compressive force can be applied by a plate or cup spring which, with radially outer regions thereof, is braced against a clutch part, such as a cover, and with farther radially inward regions engages a pressure plate. With "drawn" clutches, the compressive force can, however, also be produced by helical springs which, on the one side, can be braced against one clutch part such as a clutch cover and, on the other side, against the pressure plate. To disengage the first-mentioned clutch, a disengaging member of shifter is fastened to the ends of the tongues or fingers of the plate or cup spring and, in the case of the other type of clutch, the disengagement can be effected by providing pivotally mounted levers at the housing that are connected to the pressure plate, and also disengaging member at the radially inner regions of the levers. These disengaging members are shiftable along a guide tube fastened at the transmission side and when subjected to a force, for example, from a disengaging fork in direction away from the clutch, the clutch is "drawingly" disengaged.

Such "drawn" clutches have a disadvantage, however, with respect to "compressively stressed" clutches, that the assembly of motor and transmission units in a motor vehicle is very difficult. This results from the fact that the introduction of the guide tube provided on the transmission-side into the inner bore of the guide region of the disengaging unit, which is preassembled on the motor-side to the clutch, is very difficult because, due to the narrow or tight seat of the disengaging unit, first, the discovery or determination of the location of the inner bore is very difficult and, then, the disengaging unit twists or tilts with respect to the guide tube if the guide tube and the inner bore of the disengaging member are not guided absolutely parallel or coaxially.

It is accordingly an object of the invention to provide a disengaging unit for drawingly disengageable friction clutches which avoids the shortcomings of the heretofore known disengaging units of this general type and which facilitates the assembly of motor and transmission units.

With the foregoing and other objects in view, there is provided, in accordance with the invention, in a disengaging unit for a drawingly disengageable friction clutch having a disengaging member linkable to respective disengaging means of the friction clutch, and further having an antifriction bearing with revolving race revolvable together with the disengaging means of the friction clutch, and a nonrevolving race rigid with a hollow guide member of the disengaging unit, the disengaging member being axially slidably shiftable by means of the inner bore of the guide member along a guide tube disposed at a transmission side of the disengaging member, the guide member having at least two ring-shaped sliding regions axially spaced from one another and mutually separated by a hollow chamber, at least one of the guide member and the guide tube being formed with a capture inclination for securing the other of the guide member and the guide tube therewith, the capture inclination of the guide tube being formed by a tapering contour narrowing in direction toward the clutch side of the disengaging member at an end region of the guide tube facing toward the clutch side of the disengaging member, the capture inclination of the guide member being formed by a funnel-shaped contour flaring outwardly in direction toward the transmission side of the disengaging member at an end region of the guide member facing toward the transmission side of the disengaging member, the diameter and contour of the sliding region of the guide member facing toward the transmission side of the disengaging member, the mutual axial spacing of both sliding regions of the guide member and the construction of the hollow chamber between the sliding regions as well as the respective capture inclination being coordinated so that the disengaging member linkable to the disengaging means of the clutch and the guide tube connectible to the transmission are swingable relative to one another about the sliding region of the guide member facing toward the transmission side of the disengaging member, when the free end of the guide tube is received in vicinity of the hollow chamber of the guide member.

In this regard, it is especially advantageous with such disengaging units wherein only the guide member, such as a sliding sleeve, for example, has a capture inclination or bevel, or in case the capture inclination at the guide tube is inadequately constructed, to provide that the one ring-shaped sliding region facing toward the clutch side merge in direction toward the other ring-shaped sliding region into an outwardly flaring capture inclination.

By means of the capture inclinations at the guide tube and/or at the guide member, let us say, for example, at the guide tube, assurance is provided that also when assembling the motor and transmission unit, if the axis of the guide tube does not exactly coincide with that of the disengaging member, assembly may nevertheless be initiated, and the guide tube captured by this capture inclination or inclinations. Furthermore, through the determination or selection of the sliding region facing toward the clutch, of the hollow chamber, of the spacing between both sliding regions, as well as of the respective construction of the capture inclination at the guide tube and/or at the guide member in such a manner that, at a phase of the assembly wherein the motor and transmission units have been assembled to such an extent that the end of the guide tube is located in vicinity of the hollow chamber of the guide member, permits a swinging movement of the guide tube with respect to the disengaging member about the sliding region of the guide member facing away from the clutch and, thereby, upon further assembly thereof in axial direction, ensures the straighening-out thereof and complete further insertion without any tilting or twisting. The ring-shaped sliding region facing away from the clutch can also perform a double function, namely, the function of an aid to the insertion and also the function of sliding guidance of the disengaging member.

In accordance with a further feature of the invention, the anti-friction bearing, in axial direction thereof, is substantially symmetrical to both of the sliding regions of the guide member, because then a high degree of stability is attained.

In accordance with an added feature of the invention, the anti-friction bearing is disposed substantially in the middle in axial direction between both of the sliding regions of the guide member.

In accordance with a concomitant feature of the invention, the guide member is a sliding sleeve formed of sheet metal and, in axial direction toward the transmission side of the disengaging member, is successively formed with a radial stop contour for the nonrevolving race of the antifriction bearing, one of the slide regions, the hollow chamber, the other of the slide regions, and a funnel-shaped outwardly flaring capture inclination as well as a radially outwardly directed region as a stop for an actuating member, such as for axially shifting the disengaging fork, sliding sleeve with respect to the guide tube. These formed or shaped contours can be produced in an especially simplified manner by a rolling process.

Other features which are considered as characteristic for the invention are set forth in the appended claims.

Although the invention is illustrated and described herein as embodied in a disengaging unit for drawing disengageable friction clutches, especially for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of a disengaging unit for a drawingly disengageable friction clutch, especially for motor vehicles, in accordance with the invention; and FIG. 2 is a fragmentary view of FIG. 1 showing another embodiment of the disengaging unit.

Referring now to the drawing and first, particularly, to FIG. 1 thereof, there is shown part of a friction clutch 1 of the so-called "drawn" or "pulled" structural type having a housing 2, against the outer rim of which a conventional plate or cup spring 3 engages, the latter, at a further radially inner location thereof, striking a pressure plate 4 with a force directed toward a flywheel 5, between which and the pressure plate 4 a clutch or friction disc 6 is provided. In a radially inner region of the tongues or fingers 7 of the conventional cup or plate spring 3, a disengaging member or shifter 8 is provided, and is made up of an antifriction bearing 9, such as a ball bearing, and a sliding sleeve 10. The antifriction bearing 9 is fastened at the outer race 9a thereof to the plate-spring tongues 7 so as to be revolvable together therewith. The plate-spring tongues 7 are clamped between a radial region 9b of the bearing race 9a and a relatively smaller plate spring 11 braced against a part of the bearing race 9c on the other side of the tongues 7. The bearing race 9c is nonrevolvingly mounted on the sliding sleeve 10 and, accordingly, serves to connect the disengaging member 8 to the sliding sleeve 10.

To disengage the clutch, the disengaging member 8 is shifted by a conventional diagrammatically illustrated disengaging fork 12 in direction of the arrow A, accordingly "drawingly" disengaging the clutch.

The sliding sleeve 10 has, facing toward the transmission side B, a funnel-shaped, outwardly flaring inlet inclination 10a terminating in a radially extending marginal portion 10b having a side thereof which can be engaged by the disengaging fork 12. At the end of the inclination 10a opposite from that at which the marginal portion 10b is located, the inclination 10a merges into a first ring-shaped region 10c with which the disengaging member 8 can slide on a guide tube 13 provided at the transmission side B. In connection with the guiding region 10c, the sliding sleeve 10 has a ring-shaped hollow chamber 10d which, through a further, also conically extending capture inclination or incline 10e, merges into a second sliding region 10f for the guide tube 13. A radially extending flange 10g of the guide sleeve 10 engages over regions of the bearing race 9c.

To assemble the motor and transmission units in the motor vehicle, the clutch 1 together with the disengaging unit 8 are preassembled on the motor side C, while the guide tube 13 is preassembled on the transmission side D. When both preassembled units are driven together, namely when the guide tube 13 is guided into the bore 10h of the disengaging member 8, the axis 8A of the disengaging member 8 and the axis 13A of the guide tube 13 do not coincide in actual practice i.e. angular and/or elevational offset of the axes 8A and 13A with respect to one another exists, as indicated by the relative dispositions of the axes 8A and 13A shown in FIG. 1. It is to be noted, however, that only due to such an extreme axial offset, as shown in FIG. 1, the insertion or catching of the guide tube 13 in the bore 10h is facilitated initially due to the movement of both units toward one another in direction of the arrows D and E and, furthermore, due to the insertion operation per se, because the end of the guide tube 13 i.e. the edge 13a initially slides along the funnel or trumpet-shaped catching incline 10A. If a congruent or coinciding position of both axes 8A and 13A should not have been reached yet when the end region 13a of the guide tube 13 has penetrated into the hollow chamber 10d, the second catching incline 10e ensures that, upon further mutual travel thereof in direction of the arrows D and E, the edge 13a can move along the capture-inclination 10f, whereby the edge 13a can then also slide over the second ring-shaped sliding region, and the disengaging member 8 is found to be no longer slidable on the guide sleeve 12.

It is also apparent that both the start of the insertion operation per se is facilitated and, furthermore, during further insertion, the guide tube 13 and the disengaging member 8 cannot twist or tilt with respect to one another.

In this regard, it is advantageous if the diameter of the slide region 10c and the diameter and the extension of the ring-shaped chamber 10d are so determined or matched with respect to one another that, upon insertion, when the edge or the end region 13a of the guide tube 13 is located in vicinity of the chamber 10d, the guide tube 13 and the disengaging member 8 can execute wobble-like movements with respect to one another, whereby the insertion along the catching incline 10f is markedly facilitated.

The embodiment of disengaging or shifting unit 8' of the invention in FIG. 2 is different in several details from that of FIG. 1. Similarly constructed and functioning parts in both figures are identified by the same reference characters. In FIG. 2, the guiding member in the form of a sliding sleeve 10' again carries the antifriction bearing 9 and has a first ring-shaped sliding region 10'C on the end thereof facing toward the transmission. A second ring-shaped sliding region 10'f for the guide tube 13' is formed on the end of the sliding sleeve 10' facing toward the clutch. A ring-shaped hollow chamber 10'd is located in the sliding sleeve 10' between the two ring-shaped sliding regions 10'c and 10'f thereof. A region 10'j is suitably formed also as a capture inclination and merges into a radially directed marginal portion 10'b which is engageable by a disengaging fork such as the fork 12 of FIG. 1.

The guide tube 13' has a capture inclination 13'b which, together with the contour 10'j, if desired, performs the same function as that of the contour 10a of FIG. 1.

The transition of the ring-shaped slide region 10'f into the hollow chamber 10'd can also, in a manner similar to that shown in FIG. 1, be effected by a transition 10'e. It can, however, also have a different construction.

It is apparent that, also with the embodiment of FIG. 2, with an extreme offset or staggering or positioning of both axes 8A and 13A, a trouble-free introduction and further insertion in direction of the arrows D and E can be effected in manner equivalent to that described hereinbefore with respect to FIG. 1.

The disengaging unit 8 can also be constructed so that the guide portion i.e. the sliding sleeve 10, is integral or of one-piece construction with the non-revolving bearing race 9c.

There are claimed:

1. In a disengaging unit for a drawingly disengageable friction clutch having a disengaging member linkable to respective disengaging means of the friction clutch, and further having an anti-friction bearing with a revolving race revolvable together with the disengaging means of the friction clutch, and a nonrevolving race rigid with a hollow guide member of the disengaging unit, the disengaging member being axially slidably shiftable by means of the inner bore of the guide member along a guide tube disposed at a transmission side of the disengaging member, the improvement comprising at least two ring-shaped sliding regions formed on said guide member and being axially spaced from one another and mutually separated by a hollow chamber, one of said sliding region facing toward the clutch side of the disengaging member, and the other of said sliding regions toward the transmission side of the disengaging member, at least one of said guide member and said guide tube being formed with a capture inclination for securing the other of said guide member and said guide tube therewith, the capture inclination of said guide tube being formed by a tapering contour narrowing in direction toward the clutch side of the disengaging member at an end region of said guide tube facing toward the clutch side of the disengaging member, the capture inclination of said guide member being formed by a funnel-shaped contour flaring outwardly in direction toward the transmission side of the disengaging member at an end region of said guide member facing toward the transmission side of the disengaging member, the sliding region of said guide member which faces toward the transmission side of the disengaging member having a diameter and a contour which, together with the mutual axial spacing of both sliding regions of said guide member and the construction of said hollow chamber between said sliding regions as well as the respective capture inclination are coordinated so that the disengaging member linkable to the disengaging means of the clutch and said guide tube connectible to the transmission are swingable relative to one another about the sliding region of said guide member facing toward the transmission side of the disengaging member, when the free end of said guide tube is received in vicinity of said hollow chamber of said guide member.

2. Disengaging unit according to claim 1 including a funnel-shaped outwardly-flaring contour as a capture inclination for said guide tube additionally formed in a transition from said sliding region facing toward the clutch side and said hollow chamber of said guide member.

3. Disengaging unit according to claim 1 wherein said anti-friction bearing has an axis about which the revolving race thereof revolves, said bearing being substantially symmetrical with respect to a plane disposed substantially centrally between said sliding regions of the guide member and substantially perpendicularly to said axis.

4. Disengaging unit according to claim 1 wherein said anti-friction bearing is disposed substantially in the middle in axial direction between both of said sliding regions of the guide member.

5. Disengaging unit according to claim 1 wherein the guide member is a sliding sleeve formed of sheet metal and, in axial direction toward the transmission side of the disengaging member, is successively formed with a radial stop contour for the nonrevolving race of the antifriction bearing, one of the slide regions, the hollow chamber, the other of the slide regions, and a funnel-shaped outwardly flaring capture inclination as well as a radially outwardly directed region as a stop for an actuating member for axially shifting the sliding sleeve with respect to the guide tube.

* * * * *